Figure 1A:
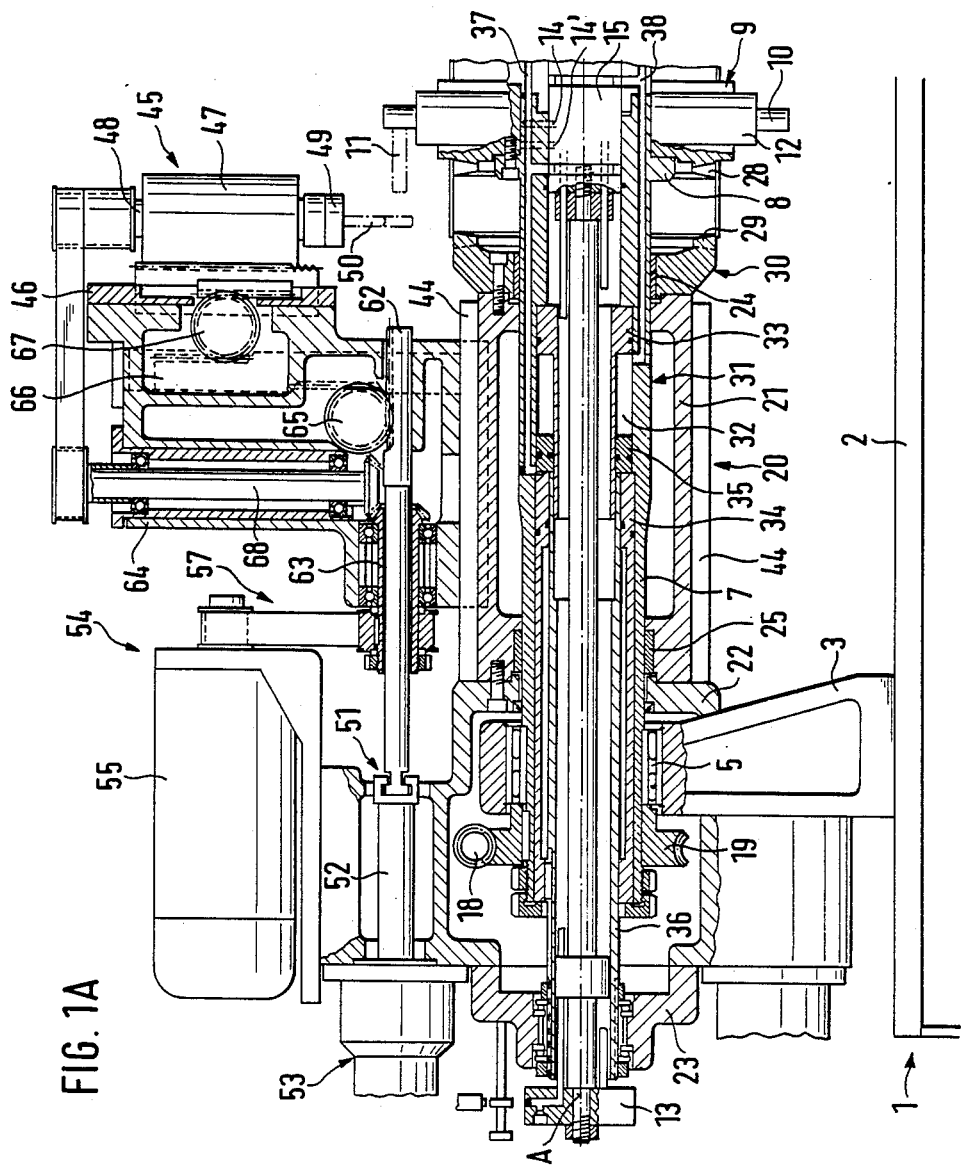

United States Patent [19]

Jauch

[11] Patent Number: 4,833,763
[45] Date of Patent: May 30, 1989

[54] MULTISTATION WORKING MACHINE

[76] Inventor: Kurt Jauch, Stritzling 191, 8351 Lalling, Fed. Rep. of Germany

[21] Appl. No.: 145,563

[22] Filed: Jan. 19, 1988

[30] Foreign Application Priority Data

Feb. 3, 1987 [DE] Fed. Rep. of Germany ....... 3703173
Feb. 3, 1987 [DE] Fed. Rep. of Germany ....... 3703174

[51] Int. Cl.$^4$ .............................................. B23D 23/00
[52] U.S. Cl. ........................................ 29/38 C; 29/40
[58] Field of Search ............... 29/38 R, 38 C, 563, 29/37 R, 38 A, 36, 39, 40, 48.5 A, 36, 35.5, 50, 51, 52, 53, 55, 26 R, 27 A, 26 A

[56] References Cited

U.S. PATENT DOCUMENTS

| | | | |
|---|---|---|---|
| 1,783,637 | 12/1930 | Tweddell | 29/41 |
| 1,841,422 | 1/1932 | Stull | 29/40 |
| 2,299,630 | 10/1942 | Kelley | 29/53 |
| 2,555,616 | 6/1951 | Swartz | 29/40 |
| 2,556,601 | 6/1951 | Schofield | 29/40 |
| 4,087,891 | 5/1978 | Schering | 29/36 |
| 4,523,359 | 6/1985 | Gippa | 29/38 A |

FOREIGN PATENT DOCUMENTS

| | | | |
|---|---|---|---|
| 1205795 | 11/1965 | Fed. Rep. of Germany . | |
| 2129515 | 10/1974 | Fed. Rep. of Germany . | |
| 335219 | 2/1959 | Switzerland | 29/36 |
| 893577 | 1/1982 | U.S.S.R. | 29/36 |

Primary Examiner—William Briggs
Attorney, Agent, or Firm—Bell, Seltzer, Park & Gibson

[57] ABSTRACT

An indexing plate (9) is mounted on a shaft (7) which is supported against axial displacement on a machine frame (1) and is stepwise rotatably drivable, said plate carrying clamping devices (10) arranged around the shaft and each intended for one workpiece (11). On either side of the indexing plate (9) a unit carrier (20) is arranged axially displaceably with respect to the shaft (7). For displacement of the unit carriers (20) towards the indexing plate (9) into a stop position and for displacement of the unit carriers (20) away from the indexing plate a displacement drive (31) is associated with each of said carriers. The two unit carriers (20) are guided solely on the shaft (7) and are supported on the machine frame (1) only against rotation. Each of the unit carriers (20) comprises a crown wheel type serration or toothing (29) which faces the indexing plate (9) and which in the stop position of the respective unit carrier is in torque-transmitting engagement with a crown wheel type serration (28) formed on the indexing plate (9) and defining the stop position. Arranged on each of the unit carriers (20) are a plurality of working units (45). For executing feed movements the working units (45) are guided displaceably on the associated unit carriers (20) and each connected to a feed unit (53) activatable in the stop position thereof.

3 Claims, 7 Drawing Sheets

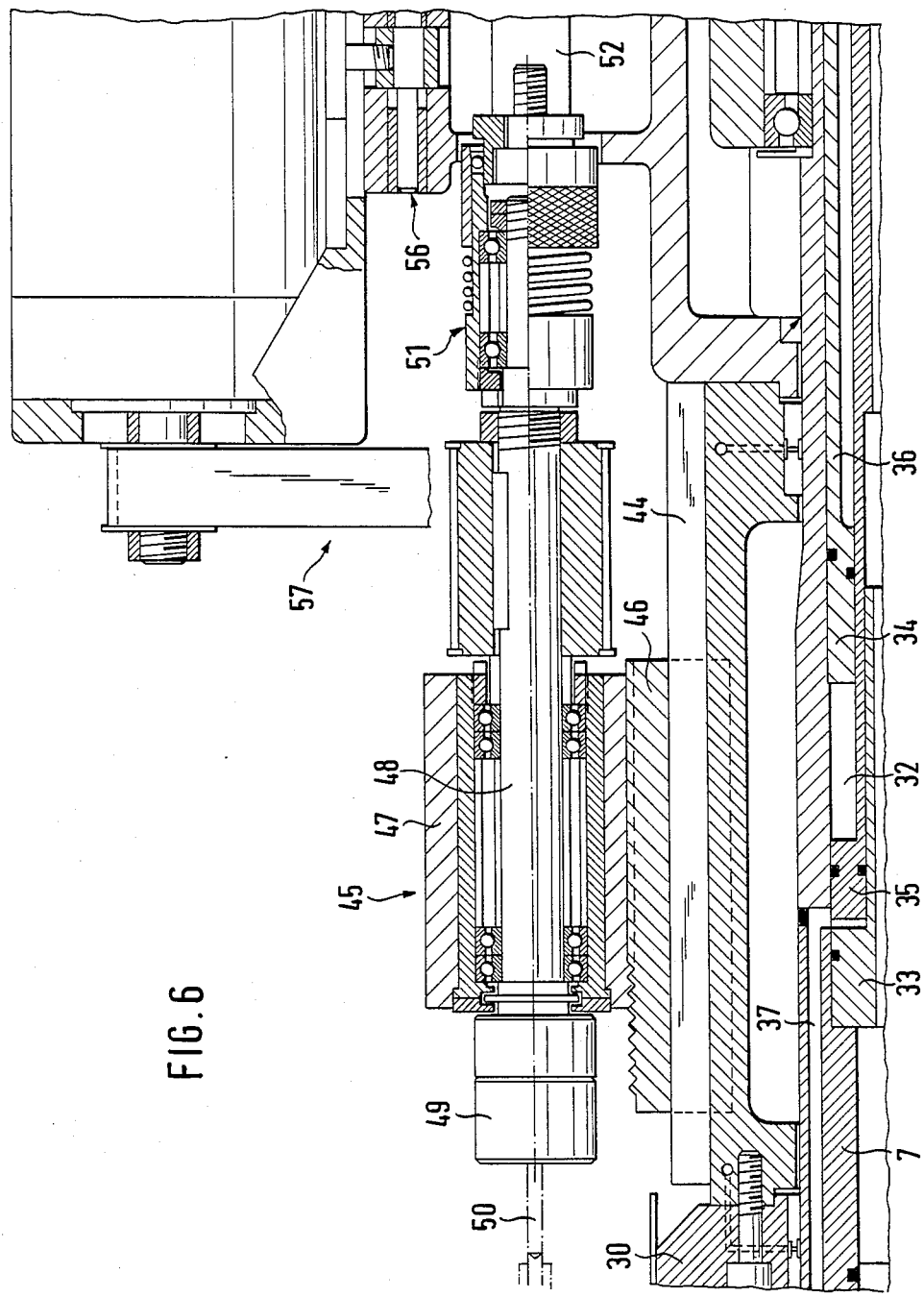

MULTISTATION WORKING MACHINE

In a multistation working machine known from DE-AS No. 1,205,795 two tool headstocks are guided axially displaceably on a machine frame. A shaft is radially mounted in the two headstocks and is further secured against axial displacement by bearing brackets belonging to the machine frame. Arranged on the shaft are an indexing plate and on either side thereof an adjustable stop nut which limits the displaceability of the adjacent headstock towards the indexing plate. In each of the two tool headstocks a plurality of working units is fixedly installed and the tool spindles of said units are driven via central gears and intermediate gears by electric motors likewise incorporated in the tool headstocks. No provision is made for axial displacement of the tool spindles with respect to the tool headstocks incorporating them. On the individual tool spindles tools corresponding to the shape of the workpieces to be worked are secured in such a manner that during the movement of the associated tool headstock they work towards the indexing plate and terminate their work at the instant in which the respective tool headstock reaches its stop position.

This known machine permits the production of workpieces of high accuracy only when the machine frame is configured so that the guides formed thereon for the two headstocks at any temperature occurring in operation extend rectilinearly and in alignment with each other and guide the two headstocks free of play. Furthermore, the drive for the stepwise executed rotations of the shaft must be extremely accurate and free of play. Finally, the stop nuts must be free of play and have stop faces extending exactly perpendicularly to the shaft so that the headstocks have an exactly defined position thereon. All these requirements can be met, if at all, only with a great production expenditure and only for a limited life of the machine.

The problem underlying the invention is therefore to further develop the multistation working machine so that it permits a high working accuracy during a long life with less expenditure for its manufacture.

According to the invention a multistation working machine comprises a shaft which is supported against axial displacement on a machine frame and rotationally drivable stepwise, an indexing plate which is secured to the shaft and carries arranged round the shaft clamping or chucking devices each for a workpiece, two unit carriers which are each arranged on one side of the indexing plate and are axially displaceable with respect to the shaft, a plurality of working units which are each arranged on one of the unit carriers, and displacement drives for displacing the unit carriers towards the indexing plate into a stop position and for displacing the unit carriers away from the indexing plate, the two unit carriers being guided solely on the shaft and supported on the machine frame only against rotation, each of the unit carriers comprising a crown wheel type serration which faces the indexing plate and which in the stop position of the respective unit carrier is in torque-transmitting engagement with a crown wheel type serration formed on the indexing plate and defining the stop position, and the working units for executing feed movements are displaceably guided on the associated unit carrier and are each connected to feed unit activatable in the stop position thereof.

This achieves that the indexing plate and the two unit carriers form in the clamped together state a rigid unit in every respect in which the location accuracy of the unit carriers with respect to the indexing plate and thus also with respect to each other is independent of influences of other components of the machine, in particular of temperature-dependent deformations of the machine frame. Temperature-dependent deformations of the unit carriers themselves also remain substantially without influence on their position and location with respect to the indexing plate. The individual working units execute their feed movements with respect to this rigid unit. The starting and end points of the feed movements are governed solely by the feed units and cannot be falsified to any extent of practical significance by location inaccuracies of the unit carriers with respect to the indexing plate.

Due to the rigid clamping of the unit carriers with respect to the indexing plate bending moments produced by cutting forces are kept away from the shaft so that the latter can be made of small diameter without this impairing the working accuracy of the machine. Any torsion of the shaft between the indexing plate and a drive for the stepwise executed rotation thereof also has no influence on the working accuracy of the machine because the rotational angular position which the indexing plate assumes with respect to the unit carriers in the stop position thereof is defined solely by the crown wheel type serrations.

DE-AS 2,129,515 discloses the use of crown wheel type serrations in an indexing plate machine which comprises an indexing plate which is mounted in a machine frame and is adapted to be raised and lowered and in the raised position is rotatable stepwise about a central shaft. Workpiece receiving means are mounted with play on the indexing plate around the central shaft parallel to the latter. Said workpiece receiving means each comprise a crown wheel type serration which on lowering of the indexing plate each engage into a complementary crown wheel type serration arranged stationarily on the machine frame. The indexing plate is resiliently yieldable in its outer rim carrying the workpiece receiving means with respect to a force clamping said plate downwardly along its central axis so that all the crown wheel type serrations associated with each other in pairs on the workpiece receiving means and on the machine frame can come simultaneously into mutual agreement.

In contrast, in the embodiment of the present invention described it is of significance that the two axially movable unit carriers are centred with respect to the indexing plate without any participation of the machine frame via in each case a pair of complementary crown wheel type serrations and are clamped or braced with respect to said indexing plate to form a rigid unit.

In a preferred further development of the embodiment of the invention described the unit carriers are each guided on the shaft by two bearings, of which at least the bearing which is nearer the indexing plate has a bearing play so that the respective unit carrier in its stop position is centred with respect to the indexing plate solely by the intermeshing crown wheel type serrations. The unit carriers are thus orientated in position with respect to the shaft by the bearings only in their position remote from the indexing plate and during the movement up to the start of the mutual engagement of the associated serrations. As the serrations come into mutual engagement they take over this centering so that in effect any position inaccuracies of the shaft with respect to the indexing plate and of the bearings with respect to the unit carriers are then no longer of any consequence.

Furthermore, the invention is preferably further developed in that the shaft is divided in the middle and comprises two flanges to which the indexing plate is secured and that the crown wheel type serrations are arranged with radial spacing around said flanges. This gives a particularly rigid clamping of the indexing plate between the two working units.

For resetting to different workpieces the machine known from DE-AS No. 1,205,795 requires a considerable amount of setting-up time. If workpieces are to be machined which differ considerably from the previously machined workpieces then depending on the nature of these differences a modification of the machine may be necessary which goes beyond the abilities of the average qualified setter and can be carried out at acceptable costs, if this is possible at all, only by specially trained personnel of the machine manufacturer.

It is therefore a further problem underlying the invention to further develop a multistation working machine in such a manner that it can easily and rapidly be set up for different working tasks.

This problem is solved according to the invention by a multistation working machine comprising an indexing plate which is mounted on a machine frame and rotatably drivable stepwise about the axis thereof, a plurality of clamping devices for each workpiece which are arranged on the indexing plate about the axis, at least one unit carrier which is movable along the axis out of a retracted position into a stop position and a plurality of working units which are arranged on the unit carrier and each comprise a tool spindle, the working units being guided displaceably each on an axis-parallel guide on the associated unit carrier and being individually exchangeable, and each working unit being coupled by a rapidly releasable coupling to a feed unit which is secured to the respective unit carrier and after the replacement of the associated working unit by another working unit being couplable to the latter in the same manner.

This makes it possible in simple manner to replace entire working units with tool spindle and tool. Since the feed units can remain on the machine particularly short resetting times result, especially since as a rule no modifications need be made to the connections for the power supply to the feed units.

It is particularly advantageous for each feed unit to have a thrust rod which is arranged coaxially with the tool spindle of the associated working unit. If the tool spindle itself is not to execute feeds parallel to the axis of the indexing plate but instead either the tool spindle as a whole is arranged radially or part thereof is to be radially advanceable, it is convenient for the thrust rod of the feed unit to be arranged coaxially with a hollow shaft preceding the tool spindle of the associated working unit.

The shortening of the resetting times which can be achieved with the invention is particularly great when each working unit has associated therewith a drive unit which on replacement of the working unit also remains on the machine. It is then not necessary as a rule to make any modifications to the connections for the power supply to the drive units either.

It is further advantageous for each drive unit to be mounted axially adjustably on the housing portion of the unit carrier to which the associated feed unit is also secured. Alternatively, the drive units can be mounted on the machine frame; this may be more convenient when the drive units are particularly heavy.

It is further advantageous when all the feed units and the unit carrier carrying them have associated therewith a common control which allows the feed units to execute their feed movements in each case after complete movement of the unit carrier towards the indexing plate and their return movements in each case overlapping in time with the movements of the unit carrier away from the indexing plate. The division of the necessary movements amongst the unit carrier or carriers on the one hand and the working units on the other makes it possible to shorten idle times in the overlapping movements away from the indexing plate.

For this purpose the machine according to the invention is preferably further developed in that the feed units are hydraulic piston-cylinder units which are connected to a fluid conduit for slow feed movements via a multiway valve and an adjustable flow regulator and for fast return movements directly via the multiway valve.

In the machine according to the invention the guides for the working units may be arranged in star manner around the axis about which the indexing plate is rotatable. In such an arrangement with a given diameter of the indexing plate the constructional space available for the guides and the working units displaceable on them is however very limited so that the guides cannot be made as robust as would be desirable in view of the high stresses by high cutting forces occurring in operation or in view of the frequent replacement of the working units.

To overcome this restriction as well the invention provides a multistation working machine comprising an indexing plate which is mounted on a machine frame and is rotatably drivable by means of a shaft stepwise about the axis thereof, a plurality of clamping devices each for a workpiece which are arranged on the indexing plate around the axis, at least one unit carrier which is arranged around the shaft and a plurality of working units which each have a tool spindle and are arranged on the unit carrier in such a manner that the geometrical axes of said tool spindles each form a generatrix of an imaginary cylinder coaxial with the indexing plate and the shaft, the working units each being displaceably guided on an axis-parallel guide on the associated unit carrier and the guides for at least one group of working units whose tool spindles succeed each other directly on the imaginary cylinder are arranged on the unit carrier like steps of stairs adjacent each other.

In this manner it is possible to accommodate on the or each unit carrier robustly dimensioned guides with working units guided thereon in a compact and nevertheless easily accessible manner.

This arrangement is preferably further developed in that of every three guides belonging to a group the two outer guides lie in a common plane closer to the axis of the indexing plate and the third centre guide lies in a plane remoter from the axis.

With a view to good accessibility of the guides and also easy removal of chips forming in the machining it is finally expedient for two groups each of three guides to be arranged in V-shaped manner on each side of the axis.

Figure 1B:
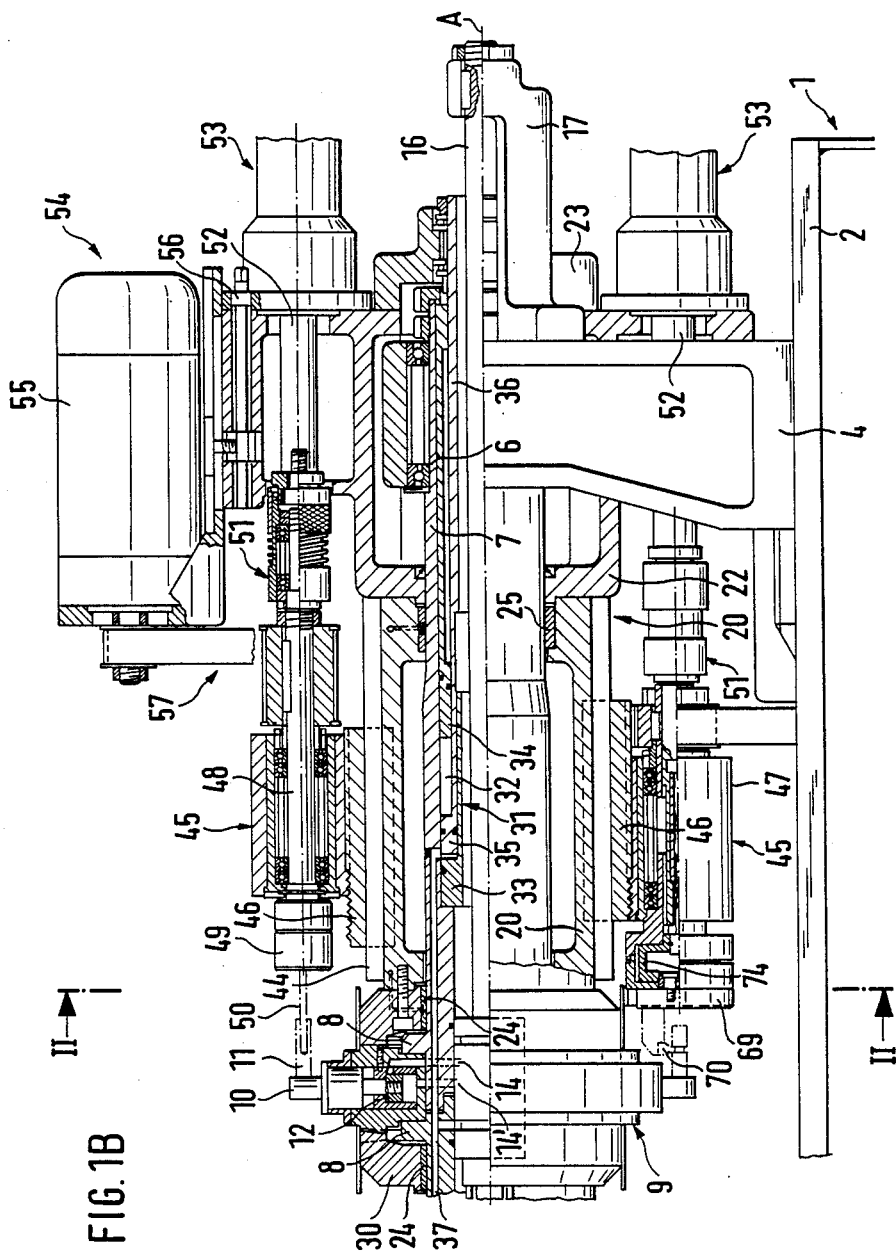
Figure 2:
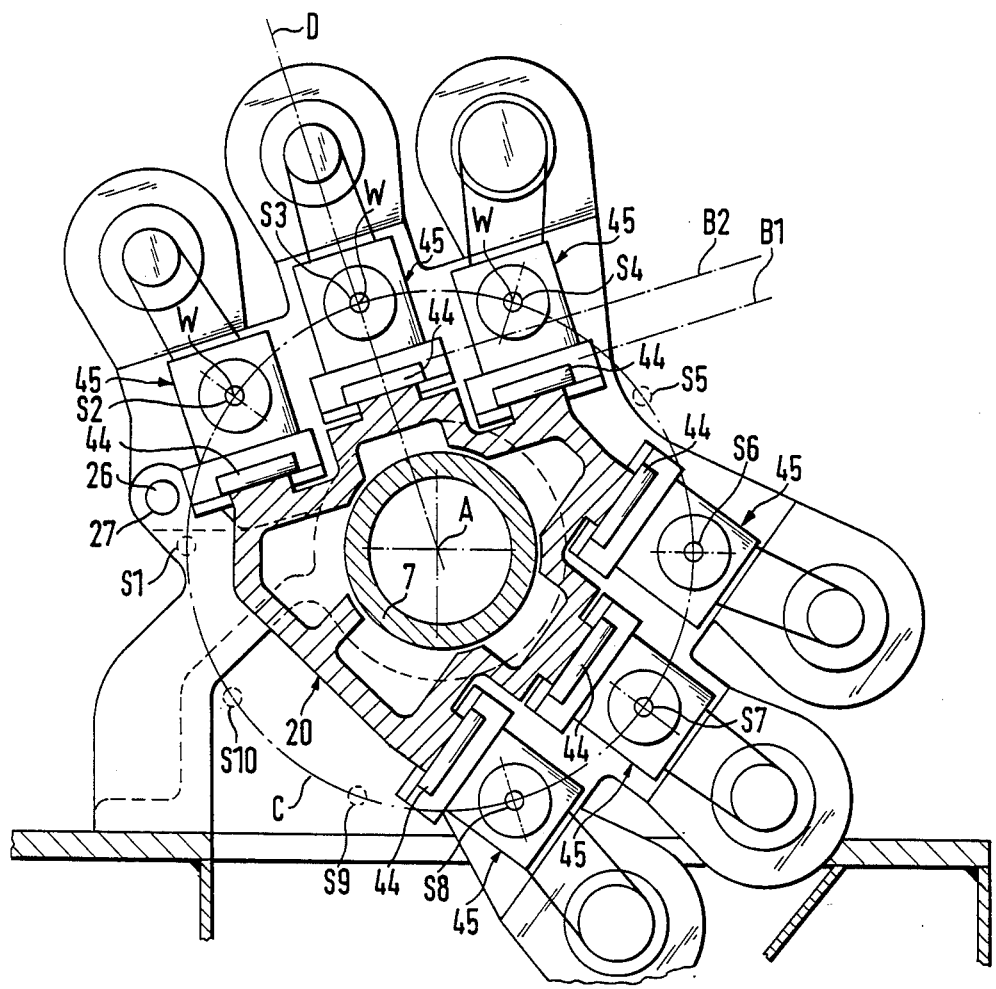
Figure 3:
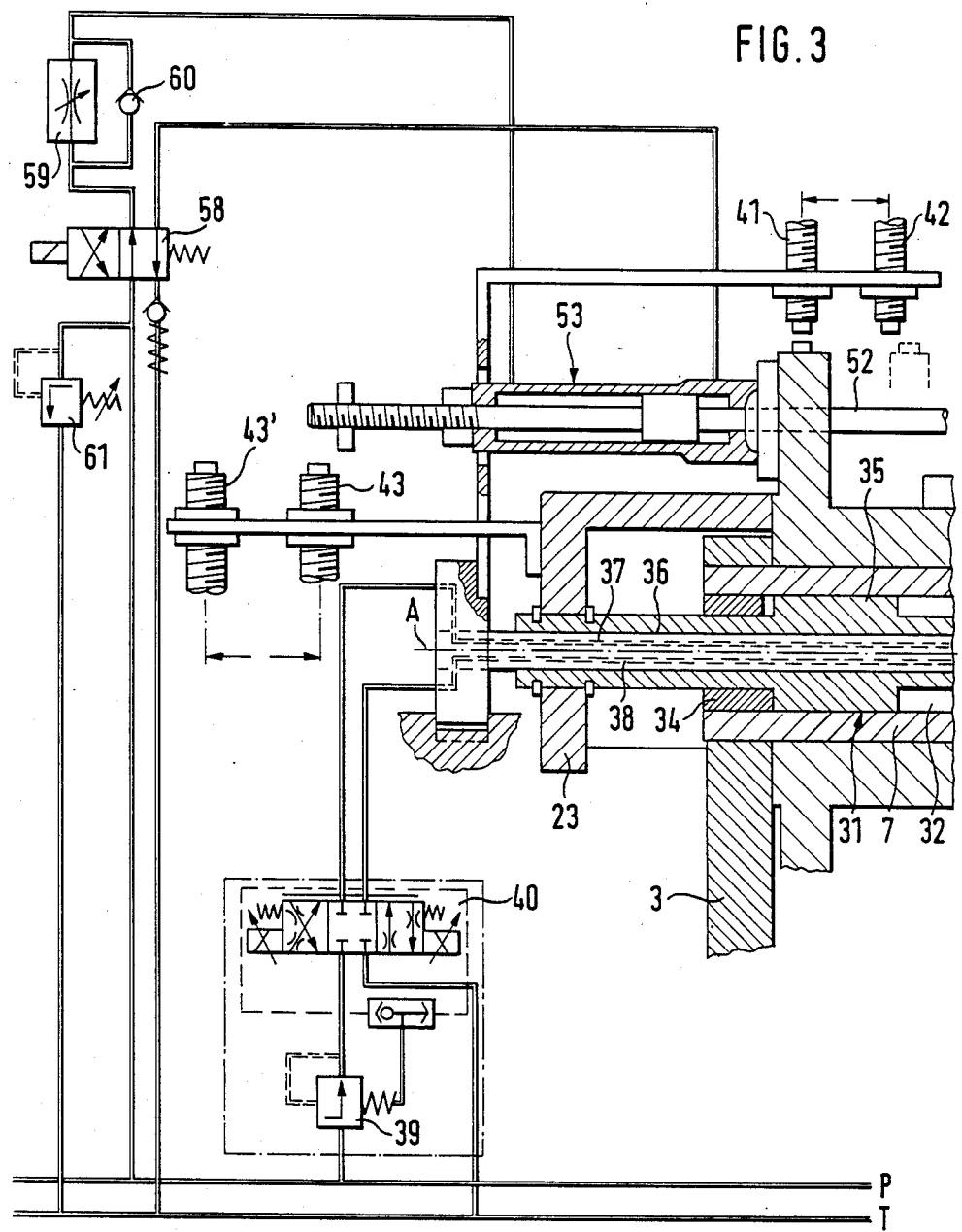
Figure 4:
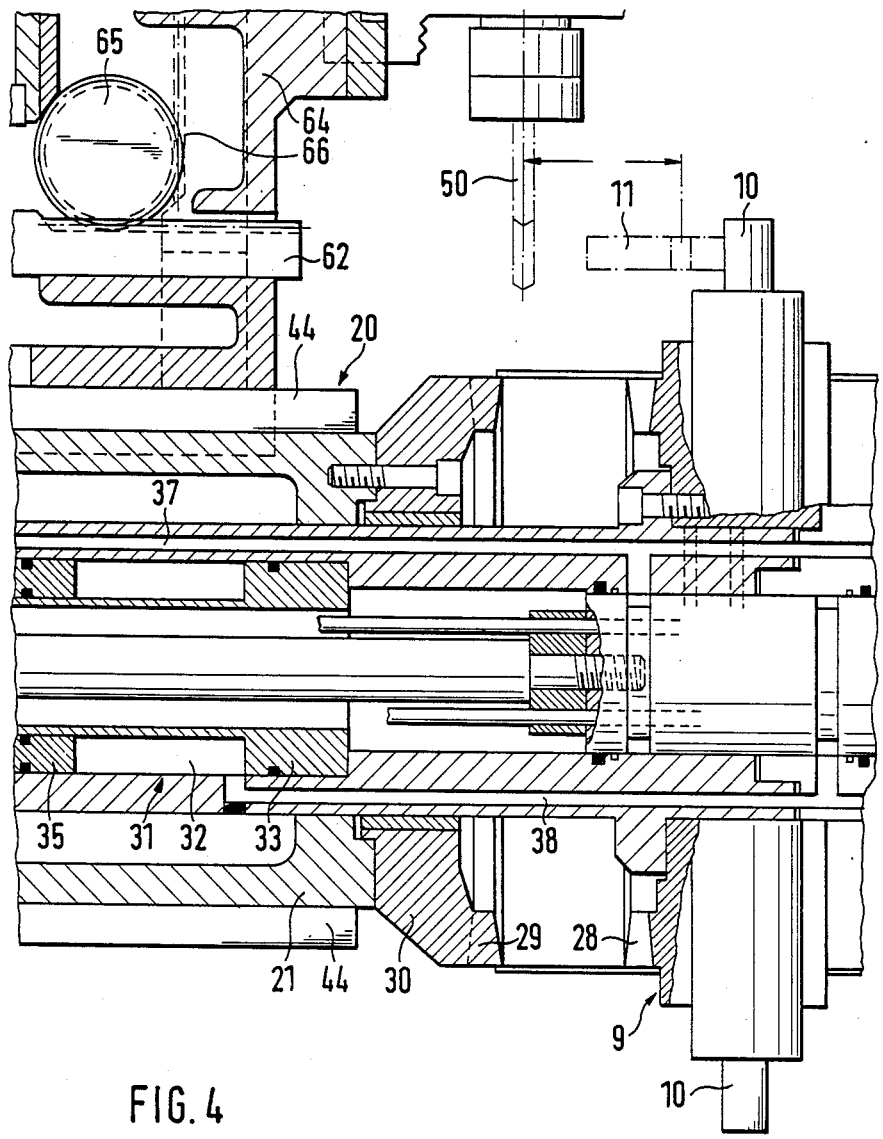
Figure 5:
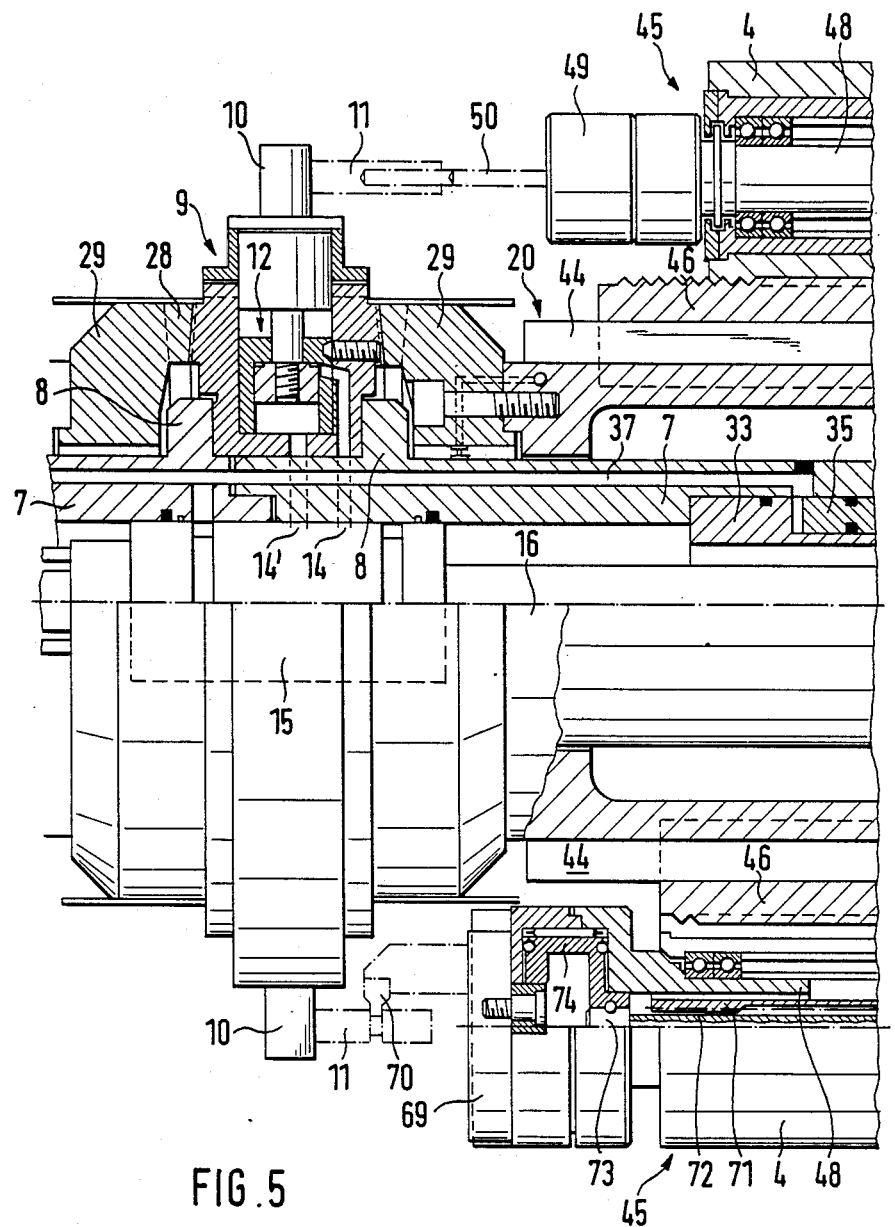

An example of embodiment with further details of the invention will be described hereinafter with the aid of schematic drawings, wherein:

FIGS. 1a and 1b shows a vertical axial section through a machine according to the invention split for space reasons into a left part in FIG. 1a and a right part in FIG. 1b, FIG. 2 is the cross-section II—II of FIG. 1b, FIG. 3 is a circuit diagram with very simplified details of FIG. 1a, FIG. 4 shows details from the right part of FIG. 1a, FIG. 5 shows details from the left part of FIG. 1b, FIG. 6 shows details from the upper part of FIG. 1b.

The machine illustrated comprises a machine frame 1 which is made up substantially of a machine table 2 and two bearing pedestals or brackets 3 and 4 rigidly mounted thereon. In the two bearing pedestals 3 and 4 a shaft 7 is mounted by means of an antifriction bearing arrangement 5 and 6 respectively. The shaft 7 comprises a horizontal axis A and is secured against axial movements at the bearing bracket 4 but can move axially with respect to the bearing bracket 3; as a result, axial stresses are avoided even with different thermal expansions of the machine table 2 and the shaft 7. The shaft 7 is divided approximately in the centre of its length; the two half shafts thereby formed each have a flange 8 which is screwed to an annular indexing plate 9.

The indexing plate 9 comprises a plurality, ten in the example illustrated, of clamping devices 10 which are offset with respect to each other by uniform angular intervals and each intended for a workpiece 11. Each of the clamping devices 10 is actuable by means of a hydraulic piston-cylinder unit 12 which is supplied with hydraulic fluid from a connecting piece 13 at the left end of the shaft 7 via axial conduits 14 and 14' and a distributor 15. The distributor 15 is arranged in the overall hollow shaft 7 and secured to a rod 16 which in turn is secured to a bracket 17 projecting away from the bearing pedestal or bracket 4 and thereby secure the distributor 15 against rotation and axial displacement.

The clamping devices 10 and piston-cylinder units 12 are of usual design and consequently need not be explained in detail The shaft 7 together with the indexing plate 9 rigidly mounted thereon is rotationally drivable stepwise through the angular interval between every two adjacent clamping devices 10, in the example of embodiment illustrated in each case through 36°, from a stepping motor, not illustrated, via a stationarily mounted worm 18 and a worm wheel 19 meshing therewith and rigidly mounted on the shaft 7. This rotary drive is also of usual construction and thus need not be explained in detail.

A unit carrier 20 is axially displaceably guided on the shaft 7 on either side of the indexing plate 9. Each of the unit carriers 20 comprises an axially inner housing part 21 with respect to the indexing plate 9, a centre housing part 22 and a cover-like outer housing part 23. The centre housing part 22 engages over a portion of the associated bearing bracket 3 or 4 without restricting the axial displaceability of the respective unit carrier 20. Sliding bearings 24 and 25 ensure the axial displaceability of the unit carrier 20 and of these bearings at least the axially inner sliding bearing 24 adjacent the indexing plate 9 has a play unusually large for machine tool guides of the order of magnitude of about one tenth of a millimeter.

To prevent the unit carrier 20 rotating on the shaft 7 or with the latter an axis-parallel rod 26 is secured to the centre housing part 22 and extends with radial clearance through a hole 27 in the associated bearing bracket 3 or 4. The radial clearance is of the order of magnitude of about 2 mm so that the pairing of the rod 26 with the hole 27 cannot perform any guide function whatever in the true sense At both end faces of the indexing plate 9 a respective crown wheel type serration 28 is formed; such crown wheel type serrations are standardized and also known under the designation Hirth serration. The crown wheel type serrations 28 are worked directly into the indexing plate 9 but may alternatively be rigidly mounted thereon as separate components. Each of said crown wheel type serrations 28 has associated therewith a complementary crown wheel type serration 29 at the opposite end face of the adjacent unit carrier 20. The crown wheel type serrations 29 are formed in the example illustrated on a robust dish-shaped component 30 which is rigidly screwed to the axially inner housing part 21 of the respective unit carrier 20 and carries the associated sliding bearing 24. The crown wheel type serrations 28 and 29 have an external diameter which is scarcely less than that of the indexing plate 9 and have an internal diameter which is considerably greater than the external diameter of the flanges 8.

As long as the associated crown wheel type serrations 28 and 29 are out of engagement, as shown in FIG. 1a, because of the play in the sliding bearing 24 the respective unit carrier 20 is guided only approximately concentrically to the shaft 7. When the unit carriers 20 are pushed towards each other the crown wheel type serrations 28 each form a stop limiting this displacement. To the extent and at the rate at which the crown wheel type serration 29 of each unit carrier 20 comes into engagement with the associated crown wheel type serration 28 on the indexing plate 9, as shown in FIG. 1b, the guide by the sliding bearings 24 at the shaft 7 becomes ineffective and the unit carriers are centred solely and very accurately with respect to the indexing plate 9.

At the end of their axial displacement towards each other the two unit carriers 20 are clamped together with the indexing plate 9 to form a rigid unit. Although the axially outer sliding bearings 25 still support the unit carriers 20 at the shaft 7, any accuracies in said supporting are however of no significance because machining operations take place only in the immediate vicinity of the indexing plate 9.

A displacement drive 31 is associated with each of the two unit carriers 20 for the axial movements thereof towards the indexing plate 9 and for clamping to said plate and for the movements away from the indexing plate. Each displacement drive 31 includes a cylinder 32 which is formed within the shaft 7 and which is bordered by two stationary annular walls 33 and 34, and an annular piston 35 arranged between said walls and rigidly connected by a tube 36 to the outer housing part 23 of the associated unit carrier 20. Each of the two cylinders 32 is connected on one side of the associated piston 35 to passages 37 and 38 which are alternately fed from a fluid conduit P via a pressure relief valve, a multiway valve 40 and the connecting piece 13 or relieved via the multiway valve 40 to a return conduit T.

The fluid conduit P is connected via a pressure accumulator, not illustrated, of usual design to the pressure side of a hydraulic pump which is also not illustrated and which furnishes a pressure of for example 100 bar. The return conduit T is connected to a tank. The volume of the pressure accumulator is so large that the displacements of the unit carriers 20 can take place mainly in quick feed or quick return. The multiway valve 40 is constructed as proportional valve and controls the displacements of the associated unit carrier 20 in such a manner that the carriers reach their end positions with greatly reduced speed.

Associated with each of the two unit carriers 20 are two stationary inductive switches 41 and 42. The switch 41 ensures on proximation of the associated unit carrier 20 to the indexing plate 9 that the associated multiway valve 40 switches to slow feed. The switch 42 ensures on proximation of the associated unit carrier 20 to its end position remote from the indexing plate 9 that the associated multiway valve 40 switches to slow return.

The switch 41 for the left unit carrier 20 illustrated in FIGS. 1a and 3 is connected in series with a corresponding switch, not illustrated, for the right unit carrier 20 illustrated in FIG. 1b. On return of the unit carriers 20 these two switches 41 together effect that the indexing plate 9 is indexed further in each case through 36° when the two unit carriers 20 have been moved away from the indexing plate to such an extent that their crown wheel type serrations 29 are free of the crown wheel type serrations 28 of the indexing plate 9. The further indexing of the indexing plate 9 also depends on inductive switches 43 which are mounted on the unit carriers 20. These switches 43 and further switches 43' also mounted on the unit carriers 20 will be explained further below.

Each of the two unit carriers 20 has on its axially inner housing part 21 a plurality of guides 44, six in the example illustrated, which extend parallel to the axis A and are constructed to axially displaceably guide one working unit 45 in each case. The nature and number of the necessary working units 45 depends on the type of machining to be carried out on the workpieces 11. According to FIG. 2 all the guides 44 of the unit carrier 20 illustrated therein and in FIG. 1b are equipped with a working unit 45.

As shown in FIGS. 1b and 2 the working units 45 may each comprise a slide 46 which is guided at the associated guide 44 and on which a low parallelepipedic housing 47 is adjustably mounted. Mounted in the housing 47 is a tool spindle 48 which is parallel to the axis A and which at its end facing the indexing plate 9 carries a chuck 49 for clamping a tool, for example a drill bit 50 and at its other end is coupled by a quick release coupling 51 to a thrust rod 52 of a feed unit 53. The thrust rod 52 is arranged coaxial with the associated tool spindle 48. In the example illustrated each thrust rod 52 is a piston rod and the associated feed unit 53 is a hydraulic piston-cylinder unit.

All the feed units 53 are mounted on the centre housing part 22 of the same unit carrier 20 on whose inner housing part 21 the associated working unit 45 is guided axially displaceably. Although the feed units 53 are basically replaceable they usually remain in place when the associated working unit 45 is refitted or replaced for different machining tasks. The couplings 51 permit a rapid exchange of the working units 45 and are so designed that in operation they can transmit axial forces between the working spindle 48 and the associated thrust rod 52 without the latter being entrained in rotation.

A drive unit 54 is further associated with each machining unit 45. The drive units 54 each have a motor 55 which is mounted via a setting means 56 axially adjustably on the centre housing part 22 of the associated unit carrier 20 and is connected via a transmission 57, for example a flat belt drive, to the associated working unit 45 to drive the tool spindle 48 thereof.

As illustrated in simplified form in FIG. 3 each of the feed units 53 is connected via a two-way valve 58 to the fluid conduit P and the return conduit T. Between the two-way valve 58 and the chamber of the feed unit 53 which is subjected to pressure for advancing the associated working or machining unit 45 a flow regulator 59 is disposed with which a check valve 60 is connected in parallel. In the return between the two-way valve 58 and the return conduit T there is a pressure-relief valve 61.

This hydraulic circuit achieves that the feed unit 53 illustrated in FIG. 3—and each correspondingly connected feed unit—imparts to the associated working unit 45 feed or advance movements with low speed adjustable at the associated flow regulator 59 and return movements of higher speed. The two-way valve 58 is controlled jointly with the multiway valve 40 in such a manner that the return movements of the feed units 53 and thus also of the associated working units 45 each take place completely or at least to a major part during the movements of the unit carriers 20 away from the indexing plate 9. The return speed of each working unit 45 is thus the sum of the return speeds of the associated feed unit 53 and the associated unit carrier 20. Feed or infeed movements produced by the feed units 53 do not however take place until the unit carriers 20 move towards the indexing plate 9 and have been clamped to the latter to form a rigid block by the forces of the central piston 35.

Each of the feed units 53 cooperates on its return with one of the switches 43 in such a manner that the latter emits a signal when the respective feed unit has reached an intermediate position with respect to the associated unit carrier 20. Only when such a signal has been emitted by all the switches 43 does the movement of the unit carriers away from the indexing plate 9 take place. If thereafter the switches 41 have also emitted signals the indexing plate 9 can index further. During the indexing the feed units 53 move further away from the switching plate 9 into a position in which they actuate the associated switch 43'. In response to the signal of the latter the unit carriers 20 are again clamped to the meanwhile further indexed indexing plate 9 and the working units 45 then carry out their feeds.

The movements of each feed unit 53 parallel to the axis A are also utilized to cause movements of an associated working unit 45 or parts thereof in other direction, for example radially. An example of this is illustrated in the upper part of FIG. 1a. The feed unit 53 indicated there is mounted like all the other feed units on the centre housing part 22 of the associated unit carrier 20 in such a manner that its thrust rod 52 extends parallel to the axis A and can thus exert only axis-parallel forces. The thrust rod 52 is coupled via the associated quick release coupling 51, which is simplified in this case, to a rack 62 which is displaceably guided parallel to the axis A within a hollow shaft 63 in a pillar 64.

The pillar 64 is fixedly clamped to one of the guides 44 of the left unit carrier 20. The rack 62 meshes with a pinion 65 which in turn meshes with a rack 66 radially guided in the pillar 64. Via a further pinion 67 mounted in the pillar 64 the rack 66 drives the slide 46 of the associated working unit 45. Said slide being guided in this case radially displaceably on the pillar 64. The tool spindle 48 of said working unit 45 is driven by the associated drive unit 54 via the hollow shaft 63 and an intermediate shaft 68 likewise radially mounted in the pillar 64. Said working unit 45, together with its pillar 64, can be just as easily exchanged as all the remaining working units.

A further working unit 45 which performs a radial infeed motion is illustrated in FIG. 1b at the bottom and in FIG. 5. The slide 46 of the working unit 45 therein is fixedly clamped directly to the associated guide 44 of the right unit carrier 20 and the housing 47 is fixedly clamped on the slide 46. On the tool spindle 48 of said working unit 45 a tool holder 69 is disposed which is adapted for radial infeed and which carries a recessing tool 70. The thrust rod 52 of the associated feed unit 53 is coupled to a tube 71 which is connected to the tool spindle 48 for rotation therewith and via a coarse thread pairing 72 to a shaft 73. In this manner feed and return movements, extending parallel to the axis A, of the feed unit 53 illustrated at the bottom right in FIG. 1b are transformed via the coarse-pitch pair 72 to relative rotations of the shaft 73 with respect to the working spindle 48. The shaft 73 is secured to a cam carrier 74 which is rotatably mounted on the tool spindle 48 and controls the radial feed movements of the tool holder 69.

The guides 44 parallel to the axis A may be arranged in star manner around the hollow shaft 7 at equal distances apart and from the axis A on the one or other unit carrier 20 or on both carriers. It is however more favourable when the guides 44, as illustrated in FIG. 2, are arranged in staircase manner in groups of three guides so that the two outer guides of each group of three guides lie in a plane B1 having a relatively small spacing from the axis A whilst the centre guide of each group of three guides 44 lies in a plane B2 parallel to the plane B1 and having a larger spacing from the axis A.

In FIG. 2 a dot-dash circle concentric with the axis A indicates an imaginary cylinder C on which lie both the geometrical axes of the workpieces 11 clamped in the clamping devices 10 of the indexing plate 9 and the geometrical axes W of the tool spindles 48 of all the working units 45 illustrated in FIG. 2. This illustration shows that the centre guide of each group of three guides 44 is arranged symmetrically with respect to a diametrical plane D; said plane D contains the axis A of the indexing plate 9 and the axis W of the tool spindle 48 which is associated with the respective centre guide. The two outer guides of the same group of three guides 44 and the associated working units 45 as well as the feed units 53 and drive units 54 are arranged as mirror images with respect to the diametrical plane D. The common plane B1 of the two outer guides and the plane B2 of the centre guide of each group of three guides extend at a right-angle to the associated diametrical plane D.

Since as mentioned the indexing plate 9 carries ten uniformly angularly spaced clamping devices and is rotatable stepwise through in each case 36°, ten stations S1 to S10 are associated therewith and each workpiece 11 clamped in a clamping or chuck device 10 passes consecutively through said stations. In the station S1 after each indexing step of the indexing plate 9 a workpiece 11 is clamped in the clamping devices 10. Said workpiece is then machined successively in the stations S2 to S4. Work can also be carried out in the station S5; for example, in the latter the working unit illustrated at the top right in FIG. 1a can be arranged which is equipped with a drill bit 50 radially aligned with respect to the axis A. Further machinings take place in the stations S6 to S8. In the station S9 the clamping device 10 which has arrived there is opened and in the station S10 the finished workpiece 11 is ejected.

Since therefore the stations S1, S9 and S10 are in any case not available for machining workpieces it is convenient as illustrated in FIG. 2 to arrange the guides 44 in V manner in two groups each of three guides 44.

I claim:
1. Multistation working machine comprising
   a shaft (7) which is supported against axial displacement on a machine frame (1) and rotationally drivable stepwise,
   an indexing plate (9) which is secured to the shaft (7) and carries arranged round the shaft clamping or chuck devices (10) each for a workpiece (11),
   two unit carriers (20) which are each arranged on opposite sides of the indexing plate (9) and are axially displaceable with respect to the shaft (7),
   a plurality of working units (45) which are arranged on each of the unit carriers (20), and
   displacement drives (31) for displacing the unit carriers (20) towards the indexing plate (9) into a stop position and for displacing the unit carriers (20) away from the indexing plate,
   the two unit carriers (20) being guided solely on the shaft (7) and supported on the machine frame (1) only against rotation,
   each of the unit carriers (20) comprising a crown wheel type serration (29) which faces the indexing plate (9) and which in the stop position of the respective unit carrier is in torque-transmitting engagement with a crown wheel type serration (28) formed on an indexing plate (9) and defining the stop position, and
   the working units (45) for executing feed movements are displaceably guided on the associated unit carrier (20) and are each connected to feed unit (53) activatable in the stop position thereof.

2. Multistation working machine according to claim 1, the unit carriers (20) being guided on the shaft (7) by two bearings (24, 25), of which at least the bearing (24) which is nearer the indexing plate (9) has a bearing play so that the respective unit carrier (20) in its stop position is centred with respect to the indexing plate (9) solely by the intermeshing crown wheel type serrations (28, 29).

3. Multistation working machine according to claim 1 or 2, the shaft (7) being divided in the middle and comprising two flanges (8) to which the indexing plate (9) is secured and that the crown wheel type serrations (28, 29) are arranged with radial spacing around said flanges.

* * * * *